(12) United States Patent
Yoshimura et al.

(10) Patent No.: US 7,997,736 B2
(45) Date of Patent: Aug. 16, 2011

(54) PROJECTION TYPE VIDEO DISPLAY APPARATUS

(75) Inventors: Taichi Yoshimura, Osaka (JP); Toshimasa Kanbara, Osaka (JP); Takeshi Fujisaki, Hyogo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 408 days.

(21) Appl. No.: 12/195,004

(22) Filed: Aug. 20, 2008

(65) Prior Publication Data

US 2009/0051882 A1   Feb. 26, 2009

(30) Foreign Application Priority Data

Aug. 23, 2007 (JP) ................. 2007-217415

(51) Int. Cl.
*G03B 21/16* (2006.01)
(52) U.S. Cl. ............... 353/52; 353/37; 353/58; 353/55; 353/56; 353/119; 353/60; 353/122; 362/285; 362/287; 362/345; 362/373; 362/294; 362/62; 362/68; 362/80; 348/789; 348/E5.128; 349/161
(58) Field of Classification Search ................. 353/52, 353/57, 58, 60, 61, 119, 122; 362/218, 285, 362/287, 345, 373, 294; 348/789, E5.128; 349/161; 326/62, 68, 80
See application file for complete search history.

(56) References Cited

U.S. PATENT DOCUMENTS

| | | | | |
|---|---|---|---|---|
| 6,111,630 A * | 8/2000 | Watanuki et al. | ............. | 349/161 |
| 6,837,583 B2 * | 1/2005 | Gishi et al. | ............. | 353/57 |
| 7,484,852 B2 * | 2/2009 | Kuraie | ............. | 353/57 |
| 7,527,680 B2 * | 5/2009 | Horiguchi et al. | ............. | 96/422 |
| 7,654,697 B2 * | 2/2010 | Yoshimura et al. | ............. | 362/294 |
| 2010/0141853 A1 * | 6/2010 | Yuyama et al. | ............. | 348/789 |

FOREIGN PATENT DOCUMENTS

JP   2000-153121 A   6/2000

* cited by examiner

*Primary Examiner* — Georgia Y Epps
*Assistant Examiner* — Sultan Chowdhury
(74) *Attorney, Agent, or Firm* — Westerman, Hattori, Daniels & Adrian, LLP (57) ABSTRACT

A projector comprises: a cooling fan for sucking ambient air through a filter; switching means for switching the operational mode of the cooling fan between a lowland mode and a highland mode; and control means adapted to obtain current fan voltage to determine the normal rpm value for that current fan voltage in reference to a highland voltage-rpm characteristic when the switching means is in the highland mode, obtain current fan rpm, and enables alarming means to issue a filter clogging alarm in the event that the current fan rpm is larger than the normal rpm value plus a predetermined value. Thus, filter clogging can be detected with precision in highlands.

10 Claims, 10 Drawing Sheets

PROJECTION TYPE VIDEO DISPLAY APPARATUS

FIELD OF THE INVENTION

This invention relates to a projection type video display apparatus in the form of, for example, a liquid crystal projector, and more particularly to a system for detecting clogging of a filter (hereinafter referred to as filter clogging detection system) for use with such projector.

BACKGROUND OF THE INVENTION

A liquid crystal projector, like other different types of electronic apparatuses, is equipped with a cooling fan for cooling their heat generating components. A filter is provided at the air inlet of these apparatuses to prevent grit and dust from entering the apparatuses.

Nevertheless, grit and dust accumulates in the filter, thereby eventually clogging the filter. Clogging of a filter will result in a pressure loss, so that clogging can be detected on the basis of a fan characteristic that the rpm of a fan increases with the loss in rotational load on the fan caused by pressure loss. For example, Japanese Patent Application Laid Open 2000-153121 teaches a filter clogging detection technique in which a voltage-rpm characteristic is defined for a cooling fan equipped with a clean filter and a determination is made that the filter is clogged as the deviation in current rpm from the voltage-rpm characteristic curve exceeds a given threshold value.

However, this prior art has a drawback in that filter clogging is not accurately detected when the projector is installed at a highland site, due to the fact that the atmospheric pressure changes with altitude and the characteristic curve is no longer adequate for accurate filter clogging detection in highlands.

SUMMARY OF THE INVENTION

In view of such drawback pertinent to prior art, the present invention seeks to provide an improved projection type video display apparatus equipped with a filter clogging detection system that can accurately detect filter clogging in highlands.

In accordance with one aspect of the invention, there is provided a projection type video display apparatus for projecting imaging light that is obtained by modulating light emitted from a light source by video signals, the projector equipped with a filter clogging detection system for detecting clogging of a filter for a cooling fan sucking air through the filter to cool heat generating components of the projector, the filter clogging detection system characterized by comprising:

switching means for switching the operational mode of the cooling fan between a lower altitude mode (hereinafter referred to as lowland mode) and a higher altitude mode (hereinafter referred to as highland mode);

control means adapted to obtain voltage of the fan in operation (the voltage hereinafter referred to as current fan voltage) to determine the normal rpm value for that current fan voltage based on a voltage-rpm characteristic to be referenced in the lowland mode of the fan (the characteristic hereinafter referred to as lowland voltage-rpm characteristic) when the switching means is in the lowland mode, obtain rpm of the fan in operation (the rpm hereinafter referred to as current fan rpm), and enable alarming means to issue a filter clogging alarm in the event that the current fan rpm is larger than the normal rpm value plus a predetermined value; and obtain current fan voltage to determine the normal rpm value for that current fan voltage based on a voltage-rpm characteristic to be referenced in the highland mode (the characteristic hereinafter referred to as highland voltage-rpm characteristic) when the switching means is in the highland mode, obtain current fan rpm, and enable alarming means to issue a filter clogging alarm in the event that the current fan rpm is larger than the normal rpm value plus a predetermined value.

In this arrangement, accurate filter clogging detection can be achieved in highlands, since, in the highland mode, current fan voltage is obtained to determine the normal rpm value for that current fan voltage in reference to a highland voltage-rpm characteristic and a filter clogging alarm is issued in the event that the current fan rpm obtained exceeds the normal rpm value plus a predetermined value.

In this case, a pre-registered voltage-rpm characteristic may be used as the lowland voltage-rpm characteristic, while a voltage-rpm characteristic that is obtained at the time when the switching means is switched over to the highland mode may be used as the highland voltage-rpm characteristic.

Thus, accurate filter clogging detection may be achieved in highlands based on the highland voltage-rpm characteristic in accord with the altitude (or atmospheric pressure) at the site of installation.

The filter clogging detection system may comprise:

pressure detection means for detecting the atmospheric pressure at the installation location of the cooling fan; and control means adapted to obtain current fan voltage, obtain the normal rpm value for that current fan voltage in reference to a lowland voltage-rpm characteristic, obtain current fan rpm, enable alarming means to issue a filter clogging alarm in the event that the atmospheric pressure detected by the pressure detection means is higher than a predetermined pressure level and that the current fan rpm is larger than the normal rpm value plus a predetermined value, and obtain the normal rpm value for that current fan voltage in reference to a highland voltage-rpm characteristic when the atmospheric pressure detected is lower than the predetermined pressure level, and enable alarming means to issue a filter clogging alarm in the event that the current fan rpm is larger than the normal fan rpm value plus a predetermined value.

In this arrangement also, accurate filter clogging detection can be achieved in highlands, since the normal rpm value for current fan voltage is obtained in reference to a highland voltage-rpm characteristic when the atmospheric pressure detected by the pressure detection means is lower than a predetermined (high altitude) pressure level and a filter clogging alarm is issued in the event that the current fan rpm is larger than the normal rpm value plus a predetermined value.

In this case, pre-registered voltage-rpm characteristics may be used as the lowland and highland voltage-rpm characteristics.

Thus, accurate filter clogging detection can be achieved in highlands without resorting to a complicated control system.

Further, a multiplicity of pre-registered voltage-rpm characteristics individually defined for different ranges of pressure may be selectively used as the highland voltage-rpm characteristic, depending on the atmospheric pressure detected by the atmospheric pressure detection means.

Thus, accurate filter clogging detection can be performed in highlands.

The filter clogging detection system may comprise:

switching means for switching the operational mode of the cooling fan between a lowland mode and a highland mode of the cooling fan; and control means adapted to obtain current fan rpm to determine the normal voltage for that current fan rpm in reference to a lowland rpm-voltage characteristic when the switching means is in the lowland mode, obtain current fan voltage, and enable alarming means to issue a filter clogging alarm in the event that the current fan voltage is less than the normal voltage minus a predetermined value, and obtain current fan rpm to determine the normal voltage for that current fan rpm in reference to a highland rpm-voltage characteristic when the switching means is in the highland mode, obtain current fan voltage, and enable alarming means to issue a filter clogging alarm in the event that the current fan voltage is less than the normal voltage minus a predetermined value.

In this arrangement, accurate filter clogging detection can be achieved in highlands, since, when the switching means is in the highland mode, the normal voltage for the current fan rpm is obtained to determine the normal voltage for that current fan rpm in reference to the highland rpm-voltage characteristic and a filter clogging alarm is issued in the event that the current fan voltage is less than the normal voltage minus a predetermined value.

In this case also, a pre-registered rpm-voltage characteristic may be used as the lowland rpm-voltage characteristic, while an rpm-voltage characteristic that is obtained at the time when the switching means is switched over to the highland mode may be used as the highland rpm-voltage characteristic.

Thus, accurate filter clogging detection may be achieved in highlands based on the highland rpm-voltage characteristic in accord with the altitude (or atmospheric pressure) at the site of installation.

The filter clogging detection system may be configured to include:

pressure detection means for detecting the atmospheric pressure at the installation site of the cooling fan; and control means adapted to obtain current fan rpm, obtain the normal voltage for that current fan rpm in reference to a lowland rpm-voltage characteristic, obtain current fan voltage, enable alarming means to issue a filter clogging alarm in the event that the atmospheric pressure detected by the pressure detection means is higher than a predetermined pressure level and that the current fan voltage is less than the normal voltage minus a predetermined value, and obtain the normal voltage for that current fan voltage in reference to a highland rpm-voltage characteristic when the atmospheric pressure detected is less than the predetermined pressure level, and enable alarming means to issue a filter clogging alarm in the event that the current fan voltage is less than the normal voltage minus a predetermined value.

In this arrangement also, accurate filter clogging detection can be achieved in highlands, since the normal voltage for current fan rpm is obtained in reference to a highland rpm-voltage characteristic when the atmospheric pressure detected by the pressure detection means is lower than a predetermined pressure level and a filter clogging alarm is issued in the event that the current fan voltage is less than the normal voltage minus a predetermined value.

In this case, pre-registered rpm-voltage characteristics may be used as the lowland and highland rpm-voltage characteristics, respectively.

Thus, accurate filter clogging detection can be achieved in highlands without resorting to a complicated control system.

Further, a multiplicity of pre-registered rpm-voltage characteristics, which are individually defined for different ranges of atmospheric pressure, may be selectively used as the highland rpm-voltage characteristic, depending on the atmospheric pressure detected by the atmospheric pressure detection means.

Thus, filter clogging detection can be accurately performed in highlands.

BRIEF DESCRIPTION OF THE DRAWINGS

FIG. 4 is a perspective of an air suction structure in accordance with one embodiment of the invention. More particularly.

FIG. 6 shows a cooling-fan mounting structure in accordance with one embodiment of the invention. More particularly.

DETAILED DESCRIPTION OF THE PREFERRED EMBODIMENTS

Figure 1:
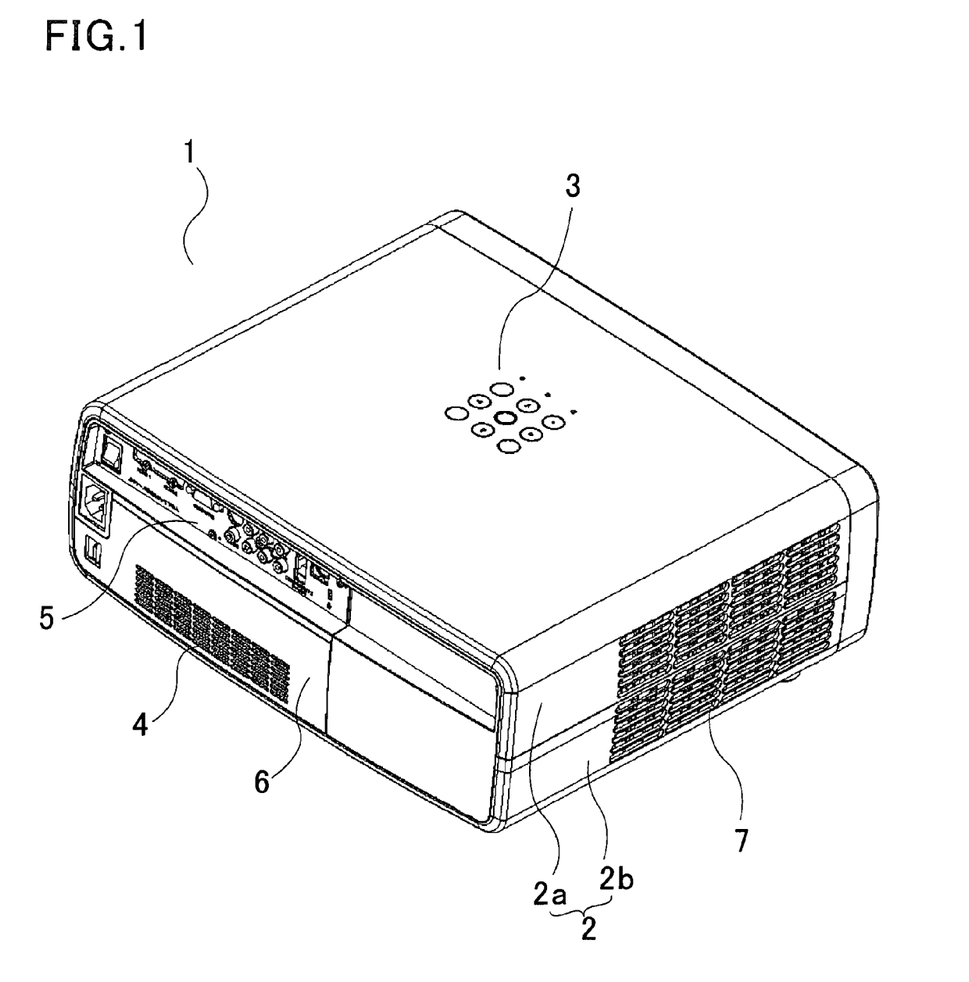
FIG. 1 is a perspective of a liquid crystal projector in accordance with one embodiment of the invention, as viewed from an upper rear point with respect to the projector.
Figure 2:
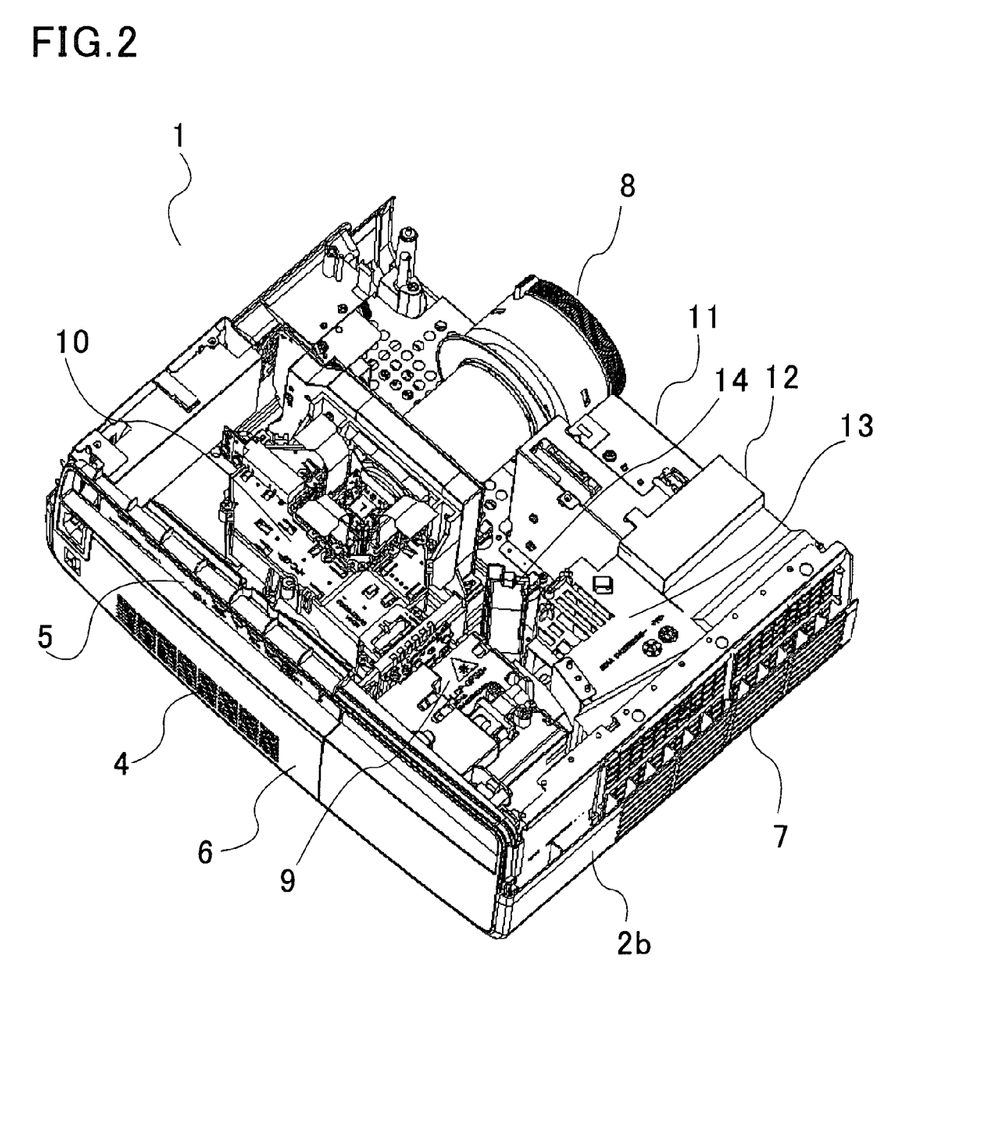
FIG. 2 is a perspective of the projector shown in FIG. 1 with its upper case and control board removed.
Figure 3:
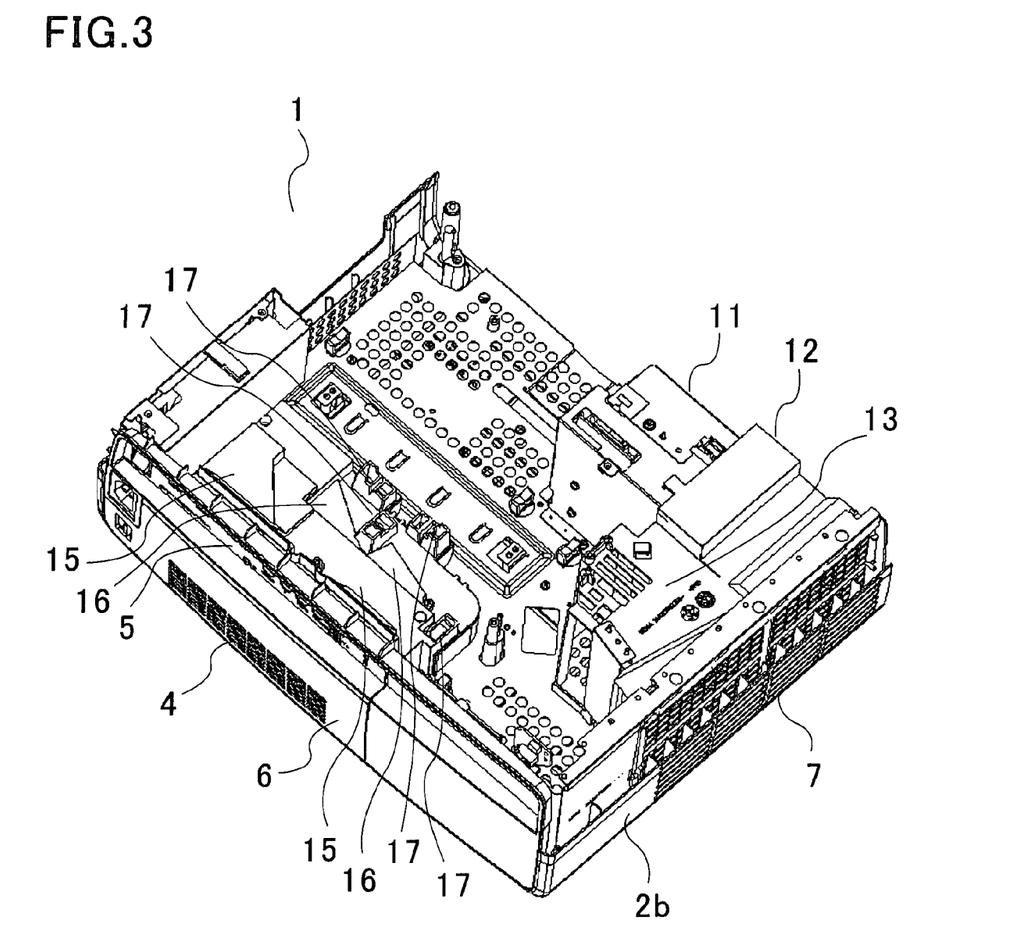
FIG. 3 is a perspective of the projector with its optical system removed.

Referring to FIGS. 1-3, there is shown in perspective an arrangement of a liquid crystal projector 1 in accordance with one embodiment of the invention. Particularly, FIG. 1 shows an appearance of the projector as viewed from an upper rear point with respect to the projector; FIG. 2 is a perspective of the projector with the upper case and control board removed; and FIG. 3 is a perspective with its optical system removed.

As seen in FIG. 1, the case 2 of the liquid crystal projector 1 has a little oblong parallelepiped shape. A controller display 3 is provided on the central region of the upper case 2a of the case 2.

Provided in the lower left side of the case 2 is an air inlet 4 for introducing cooling air, and an AV panel 5 having exposed input-output cable terminals for inputting and outputting video and audio signals. The air inlet 4 is formed in an openable and closeable lid 6. The inlet 4 has multiple ventilation slits. By opening the lid 6, a detachable filter 21 can be mounted as described in detail below.

On the other hand, as viewed from the rear end of the case, an air outlet 7 is formed across the upper case 2a and lower case 2b.

A projection lens 8 is exposed in the front end of the projector, as shown in FIG. 2. Viewed from the front end of the case, a light source unit 9 is arranged in the left rear section of the case 2 (or lower case 2b). An L-shaped optical system 10 extends from the light source to the projection lens 3.

A power supply unit 11 is provided adjacent the left side of the projection lens 8. Arranged between the power supply unit 11 and the air outlet 7 is an exhaust fan 12 in the form of an axial fan (propeller fan) for cooling the power unit. In addition to the axial fan 12, a further axial fan 13 is provided adjacent the light source unit 9 to cool the light source unit 9 and its surroundings. The light source unit 9 includes, for example, an ultra-high pressure mercury lamp and becomes heated to a significantly high temperature, so that a further dedicated centrifugal fan (Silocco fan) 14 is provided to cool the lamp of the light source unit 9.

On the other hand, as shown in FIG. 3, there are provided inside the air inlet 4 two centrifugal fans (Silocco fans) 15 for cooling the optical components such as liquid crystal panels for red (R), green (G), and blue (B) beams of light, polarization plates, and polarization beam splitters. Cooling air is blown by the centrifugal fans 15 through an air discharge duct 16 and discharged from its outlet 17 to the optical components.

Figure 4A:
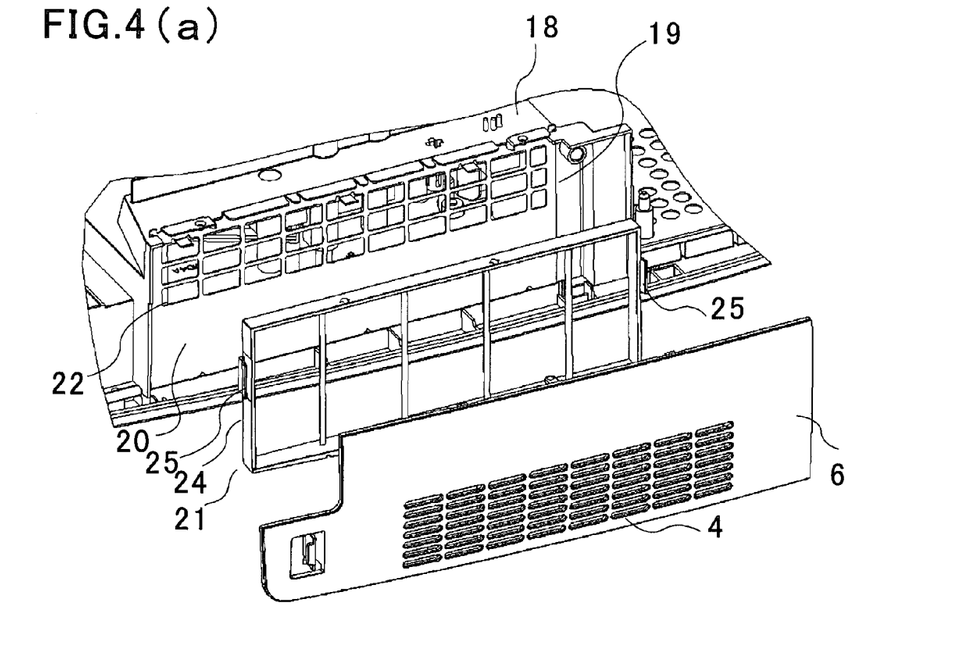
FIG. 4(a) is an exploded perspective of the air inlet section of the air suction structure.
Figure 4B:
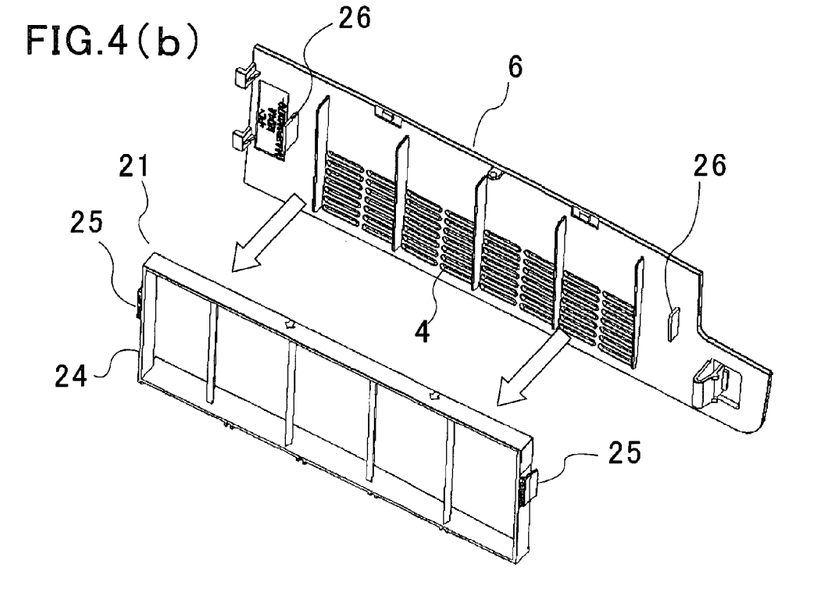
FIG. 4(b) shows an exemplary arrangement of a lid and a filter as viewed from inside the projector.
Figure 5:
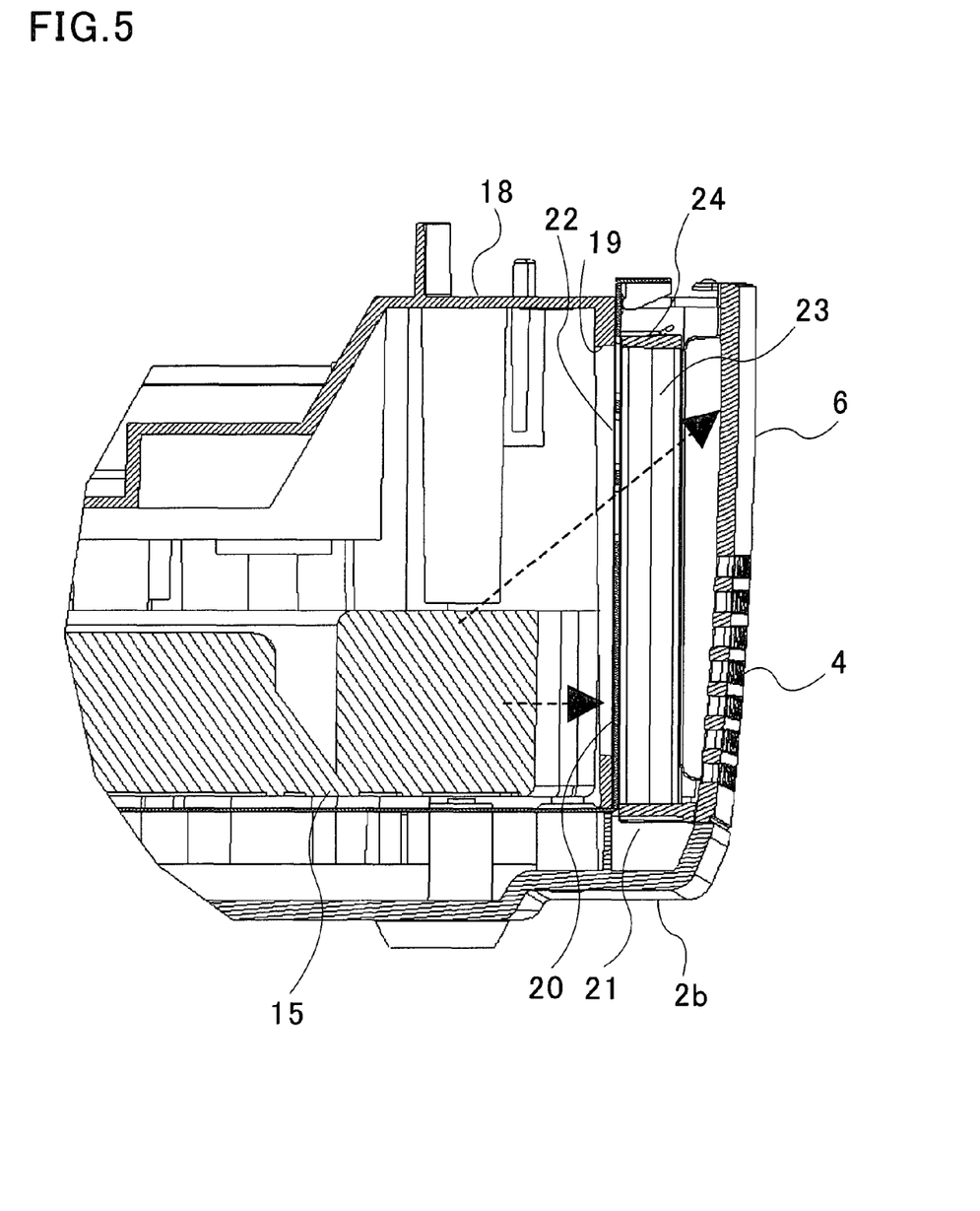
FIG. 5 is a partial vertical cross section of the air inlet section.

FIGS. 4 and 5 show an air suction structure in accordance with one embodiment of the invention. More particularly, FIG. 4(a) shows in exploded perspective a main portion of the air inlet of the structure, FIG. 4(b) shows in exploded perspective the arrangement of the lid 6 in relation to a filter 21 as viewed outward from inside the case 1. FIG. 5 is a partial vertical cross section of the main portions of the air inlets.

In this embodiment, the air inlet 19 of an air suction duct 18 for the centrifugal fans 15 is provided with the openable and closeable lid 6, which allows installation of a detachable filter 21. A shield member 20 for shielding electromagnetic waves is mounted before the filter 21 is mounted across the inlet 19, because, if the shield member 20 were mounted between the filter 21 and the lid 6 after the filter 21, the shield member 20 would not only hinder mounting and dismounting the filter 21 but also fail to maintain intimate contact with other shield members surrounding the air inlet 19.

As shown in FIG. 5, the lid 6 forming a part of the case 1 and the shield member 20 forming an internal wall are formed with the air inlet 4 and 22, respectively, in the form of multiple slits such that the air inlets 4 and 22 are offset each other so as not to be linearly aligned with the centrifugal fan 15 mounted inside the air inlet 19. Specifically, the air inlet 4 of the lid 6 and the air inlet 22 of the of the shield member 20 are offset each other in the vertical direction. In the example shown herein, the air inlet 22 is located higher than the air inlet 4. Thus, the noise generated by the centrifugal fan 15 and tending to escape from the air inlet 19 of the air inlet duct 18 is blocked by the non-slit sections of the shield member 20 and the lid 6, as shown by broken arrows, from leaking directly from the air inlet 4.

In the example shown herein, a pleat type filter 21 is disposed between the lid 6 and the shield member 20 such that the grooves of the pleats of the filtering material 23 of the filter 21 extend from the air inlet 4 of the lid 6 to the air inlet 22 of the shield member 20. Specifically in the embodiment shown herein, the pleats extend substantially in the vertical direction.

In this example the pleated filter 21 is arranged with its pleats oriented in the vertical direction. However, when the air inlet 4 of the lid 6 and the air inlet 22 of the shield member 20 are offset each other in the horizontal (or transverse) direction, the pleats of the filter need be oriented in the same horizontal direction.

As shown in FIG. 4, there are provided, on the opposite sides of the frame 24 of the pleat type filter 21, elastic pieces 25 each formed to extend towards the lid 6 and having a tip slightly bent outwardly. On the other hand, formed on the opposite inner sides of the internal surface of the lid 6 are push pieces 26, which project towards the resilient pieces 25. Thus, as the lid 6 is closed, the protruding push pieces 26 come into sliding engagement with (the inner faces of) the resilient pieces 25 of the filter frame 24, thereby causing the filter 21 to be resiliently pushed against the air inlet 19 via the shield member 20.

Although the resilient members 25 are shown above to be formed on the frame 24 of the filter 21 and the protruding push pieces 26 on the lid 6, protruding pieces such as protruding push pieces 26 may be formed alternatively on the frame 24 of the filter 21 and resilient members such as resilient pieces 25 on the lid 6. Further alternatively, either one of the frame 24 of the filter 21 or the lid 6 may be provided with resilient members that abuts against the other. In short, it suffices to provide resilient members to either the filter 21 or the lid 6 so that the resilient members will push the filter 21 against the air inlet 19 via the shield member 20 when the lid 6 is closed.

Figure 6A:
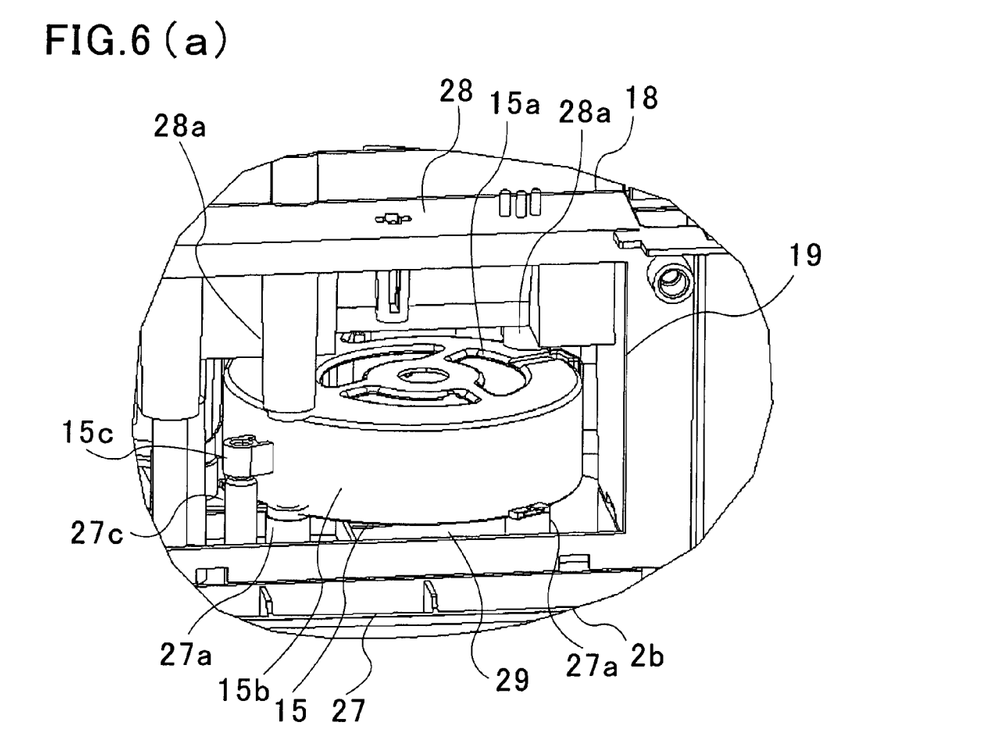
FIG. 6(a) is a perspective of a main portion of the mounting structure.
Figure 6B:
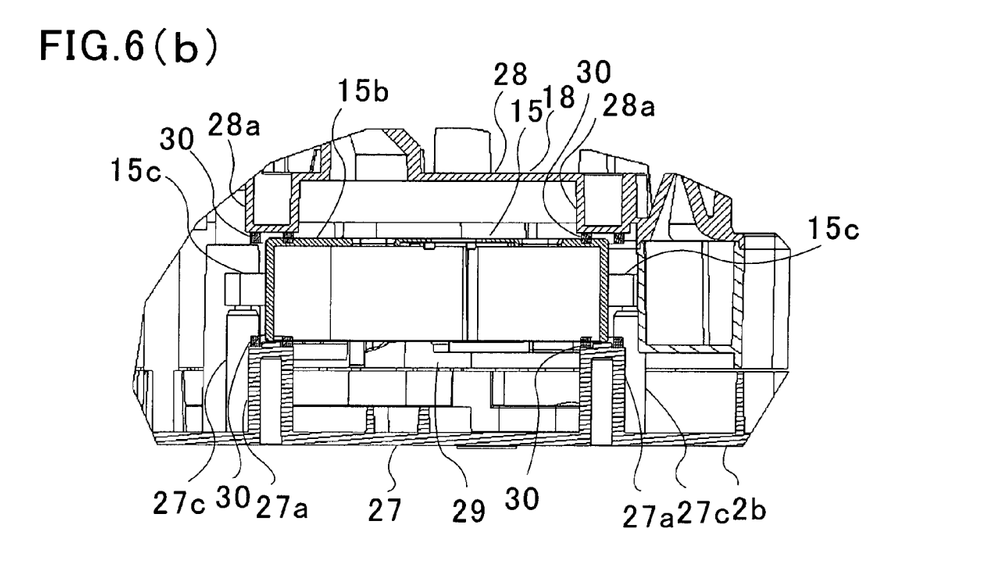
FIG. 6(b) is a vertical cross section of the main portion of the structure.

FIG. 6(a) shows in perspective a main portion of the cooling fan mounting structure in accordance with the embodiment of the invention; and FIG. 6(b) is a partial vertical cross section of the structure.

In this embodiment, the centrifugal cooling fan 15, installed inside the air inlet 19, is secured on a mount 29. The mount 29 consists of a fan supporting section 27 of the lower case 2b, and a fan cover section 28 of the air inlet duct 18 located on the air suction side of the air inlet 15a of the centrifugal fan 15.

The centrifugal fan 15 is firmly fixed in position on the mount 29 by first positioning the pair of protruding positioning pieces 15c formed on the periphery of the casing 15b of the centrifugal fan 15 at corresponding protruding positioning sections 27c formed on the fan supporting section 27 and then firmly fixing them together with screws for example.

Formed on both of the fan supporting section 27 and fan cover section 28 are a pair of supporting projections 27a and a pair of supporting projections 28a, respectively, projecting to the centrifugal fan 15. The projections of each pair are symmetric with respect to the center of the centrifugal fan 15, and positioned radially inside the positioning pieces 15c. The lower supporting projections 27a are axially aligned with corresponding upper supporting projections 28a. In the example shown herein, these supporting projections 27a and 28a are formed to abut against the materially strong peripheral wall of the casing 15b of the centrifugal fan 15.

Each of the supporting projections 27a and 28a is provided on the tip thereof with a ring shaped resilient member 30 bonded with an adhesive. As a consequence, the centrifugal fan 15 is firmly secured by the upper and lower supporting projections 28a and 27a, respectively, via the resilient members 30.

It should be understood that, although only one of the two centrifugal fans 15 installed inside the air inlet 19 is shown in FIG. 6, the other one is also arranged in the same manner as described above.

Figure 7:
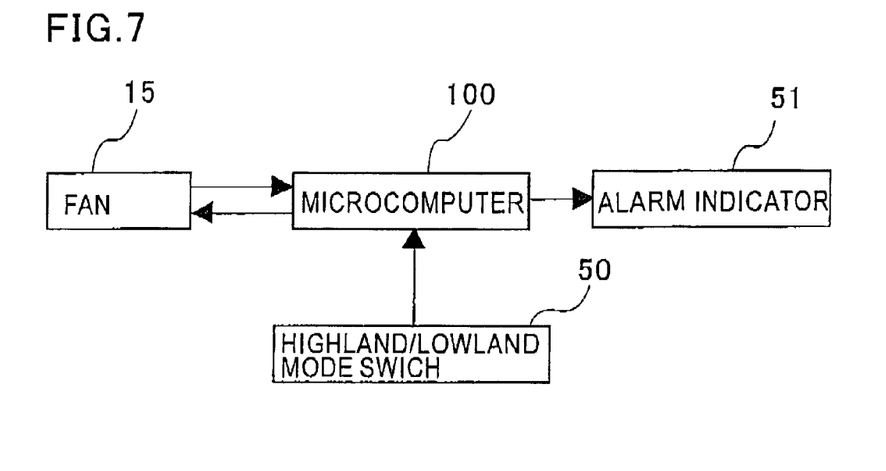
FIG. 7 is a block diagram of a filter clogging detection system in accordance with one embodiment of the invention.
Figure 8:
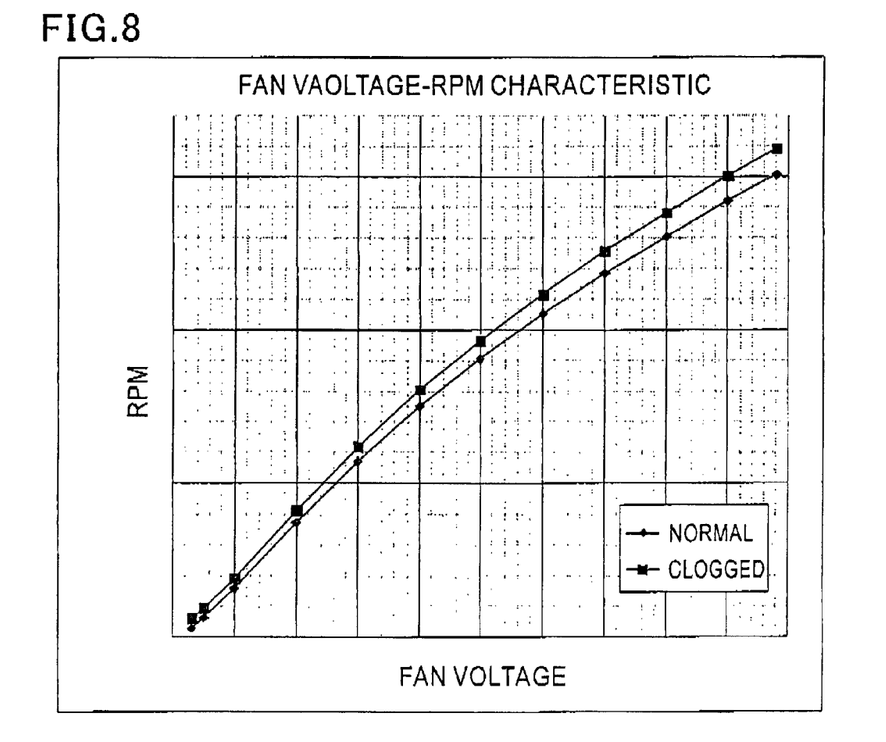
FIG. 8 is a graphical representation of the voltage-rpm characteristic of an exemplary cooling fan.

FIG. 7 is a block diagram showing a filter clogging detection system in accordance with one embodiment of the invention. FIG. 8 is a graphical representation of the voltage-rpm characteristic of an exemplary fan.

In the embodiment shown herein, the control means is provided with a lowland-highland switch (switching means) 50 for switching the operational mode of the centrifugal fan (cooling fan) 15 between a lowland mode and a highland mode. The switching means is implemented as a software switch accessible for a user from a menu. The controller display 3 has an alarm indicator (alarming means) 51 in the form of an LED, for example, that can flicker to indicate filter clogging alarm issued. The highland-lowland mode switch 50 may be implemented as a hardware switch in the controller display 3. The LED alarm indicator 51 may be substituted for by, or may be used together with, a buzzer or a spoken direction.

When the highland-lowland mode switch 50 is in the lowland mode, a microcomputer 100 (serving as the control means controlling the entire liquid crystal projector 1) obtains current fan voltage of the fan 15 (i.e. the fan voltage of the fan 15 in operation) to determine the normal rpm value for that current fan voltage based on the lowland voltage-rpm characteristic (represented by "NORMAL" line in FIG. 8) stored in a built-in non-volatile memory of the microcomputer 100. The microcomputer 100 further obtains current fan rpm of the fan 15 and issue a filter clogging alarm indicative of the filter 21 being clogged in the event that the current fan rpm is larger than the normal rpm value plus a predetermined value (which equals "CLOGGED" rpm value minus "NORMAL" rpm value for a given fan voltage in FIG. 8). This is done by turning on the alarm indicator 51 to display the alarm.

On the other hand, when the projector is installed at a highland site (with the filter 21 being clean) and the highland-lowland mode switch 50 is in the highland mode, the microcomputer 100 determines a voltage-rpm characteristic for the fan 15 in operation and store it in the built-in rewritable non-volatile memory of the microcomputer 100. The microcomputer 100 then obtains current fan voltage of the fan 15 to determine the normal rpm value for that current fan voltage in reference to the highland voltage-rpm characteristic stored in the memory. The microcomputer 100 then obtains current fan rpm of the fan 15, and issue a filter clogging alarm indicative of the filter 21 being clogged by the alarm indicator 51 as the current fan rpm exceeds the normal rpm value plus a predetermined value.

With the arrangement as described above, the liquid crystal projector 1 splits the light emitted from the light source unit 9 as shown in FIG. 2 to three beams of red (R), green (G), and blue (B) light by means of the optical system 10. The R-, G-, and B-beams are respectively modulated in the respective liquid crystal panels by video signals and synthesized by a dichroic prism. The resultant beam is projected by the projection lens 8 onto a screen.

The optical components constituting the optical system 10, such as liquid crystal panels for the respective three colors, polarization plates, and beam splitters, are cooled by the air blown by the two built-in centrifugal fans 15 through the outlet duct 16, and discharged from the air outlet 17. The centrifugal fans 15 are disposed inside the air inlet 4.

The light source unit 9 is cooled not only by the air blown by a dedicated centrifugal fan 14 as shown in FIG. 2 but also by the stream of air that is sucked in from around the heated lamps by an axial fan 13 and discharged externally from the air outlet 7.

On the other hand, the power source unit 11 is cooled by the stream of air established by the axial fan 12 that forces the internal air to flow through and around heated components of the projector and to the air outlet 7, and by the stream of air established by the axial fan 12 sucking air through and from around the power supply unit 11.

Figure 9:
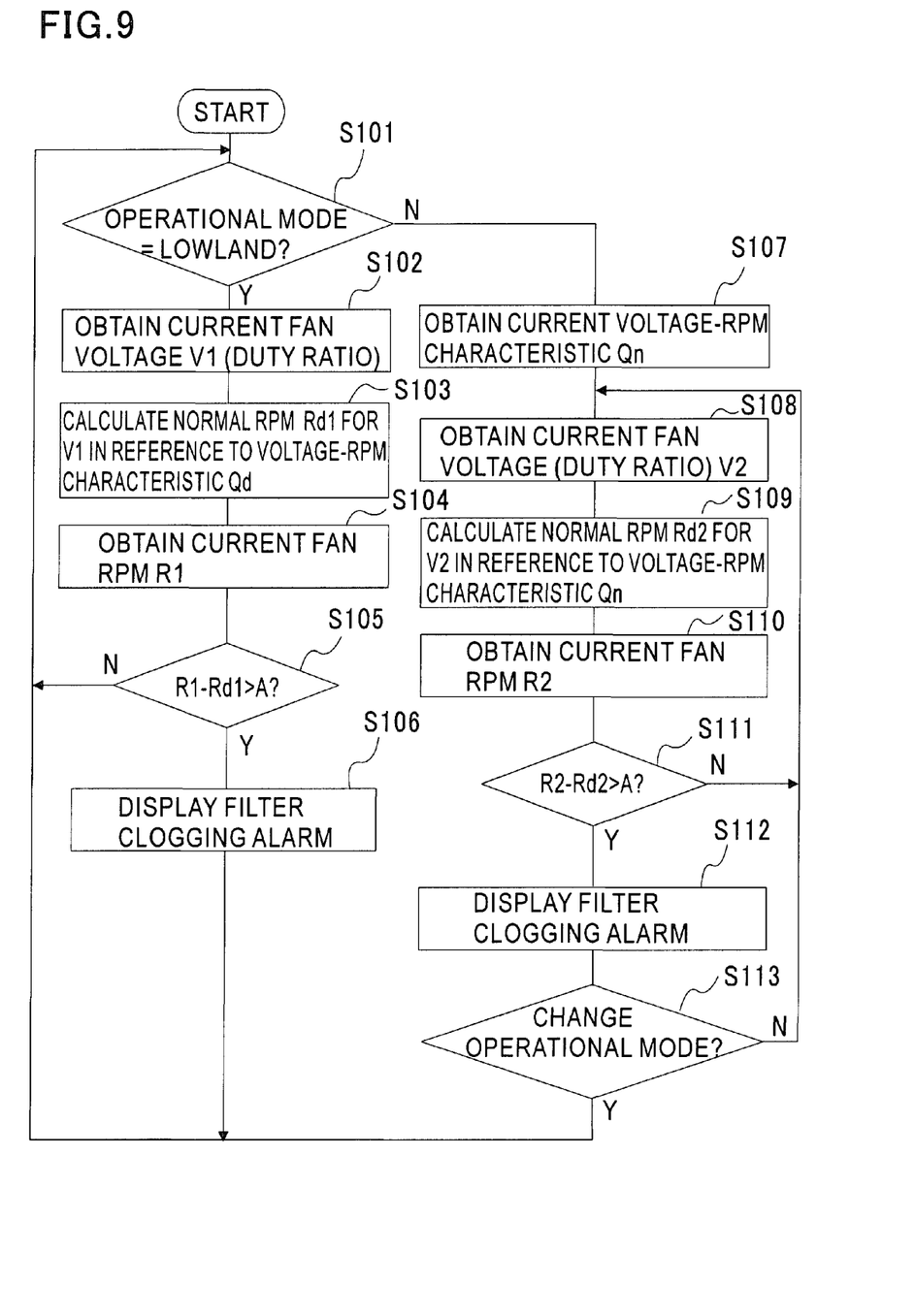
FIG. 9 is a flowchart illustrating major steps of the filter clogging detection process governed by a microcomputer in accordance with one embodiment of the invention.

FIG. 9 is a flowchart illustrating major steps of the filter clogging detection process governed by the microcomputer 100 in accordance with the embodiment.

As the process is started, a determination is made in step S101 as to which of highland mode and the lowland mode the cooling fan 15 is set to by the highland-lowland mode switch 50.

If the fan is in the lowland mode (YES in step S101), the microcomputer 100 obtains current fan voltage V1 (the duty ratio of PWM control) of the centrifugal fan 15 (step S102), and determine the normal rpm value Rd1 for that current fan voltage V1 in reference to the pre-registered lowland voltage-rpm characteristic stored in the non-volatile memory of the microcomputer 100 (step S103).

Next, in step S104, current fan rpm R1 (fan rpm of the centrifugal fan 15 in operation) is obtained and compared with the normal rpm value Rd1 to see whether the current fan rpm R1 is larger than the normal rpm value Rd1 plus a predetermined value A, that is, whether R1−Rd1>A or not (step S105). The magnitude of A depends on the fan voltage, as shown in FIG. 8. Its dependency on the fan voltage is also registered in the non-volatile memory of the microcomputer 100.

While the current fan rpm R1 is not larger than the normal rpm value Rd1 plus the value A, the operation will loop back to step S101 and goes through the steps described above. As the fan rpm R1 becomes larger than the normal rpm value Rd1 plus the value A ("YES" in step S105), implying that the filter 21 is clogged, the microcomputer 100 causes the LED of the alarm indicator 51, for example, to flicker to indicate filter clogging status (step S106). Recognizing clogging of the filter 21 from the alarm, the operator of the projector can resolve the filter clogging problem by opening the lid 6 and doing appropriate maintenance work.

On the other hand, when the liquid crystal projector, equipped with a clean filter 21, is set up at a highland site and the highland-lowland mode switch 50 is set to the highland mode, a determination is made in step S101 that the switch is not in the lowland mode. The process then proceeds to step S107.

In step S107, a new voltage-rpm characteristic Qn is obtained for the centrifugal fan 15 in operation at the current altitude (atmospheric pressure). The voltage-rpm characteristic Qn is stored in the non-volatile memory of the microcomputer 100.

In a similar fashion as described above, current fan voltage V2 of the centrifugal fan 15 is obtained (step S108) to determine the normal rpm value Rd2 for that current fan voltage V2 in reference to the pre-registered highland voltage-rpm characteristic Qn (step S109).

Next, in step S110, current fan rpm R2 of the centrifugal fan 15 is obtained to see if the current fan rpm is larger than the normal rpm value plus a predetermined value A (i.e. R2−Rd2>A) in step S111.

While the fan rpm R2 is not larger than the normal rpm value Rd2 plus the value A, the process is returned from step S111 to step S108. As the current fan rpm R2 becomes larger than the normal rpm value Rd2 plus the value A ("YES" in step S111), implying that the filter 21 is clogged, a filter clogging alarm is issued, causing an LED of the alarm indicator 51, for example, to flicker to indicate filter clogging status (step S112). Recognizing clogging of the filter 21 from the alarm, the operator of the projector can resolve the filter clogging problem by opening the lid 6 and doing appropriate maintenance work.

In the highland mode, unless the operational mode is changed subsequent to changing installation site, the process loops through steps S108-S113 without advancing to step S107 to update the voltage-rpm characteristic Qn. If, however, the operational mode is changed subsequent to a change in installation site, the process returns to the first step S101 to go all over again.

In this way, in accordance with the present embodiment, when the highland-lowland mode switch 50 is in the highland mode, the filter clogging detection system obtains current fan voltage V2 to determine the normal rpm value Rd2 for that current fan voltage V2 based on the highland voltage-rpm characteristic Qn, and obtains current fan rpm R2 to check whether or not the current fan rpm is larger than the normal rpm value plus a predetermined value A. If it is, the alarm indicator 51 is turned on to display the alarm that the filter 21 is clogged. Thus, filter clogging is detected with precision even in highlands.

By employing a pre-registered lowland voltage-rpm characteristic as the lowland voltage-rpm characteristic Qd and employing the voltage-rpm characteristic that is obtained at the time when the highland-lowland mode switch 50 is switched over to the highland mode as the highland voltage-rpm characteristic Qn, accurate filter clogging detection can be carried out in accord with the altitude (or the atmospheric pressure) at the installation site.

Since a projection type video display apparatus such as a liquid crystal projector 1 as embodied herein includes a precision optical system that must be protected from dust and requires cooling, the filter clogging detection system of the invention is especially advantageous to such apparatus.

It is noted that, in the air suction structure of the embodiment, at least one of the filter 21 and the lid 6 is provided with resilient engagement members for resiliently forcing the filter 21 against the air inlet 19 via the shield member 20 when the lid 6 is closed, and that this arrangement ensures intimate contact between the filter 21, the air inlet 19, and the shield member 20. As a result, filter performance is enhanced if the shield member 20 is disposed between the air inlet 19 and the filter 21.

It is further noted that performance of the filter 21 is improved by composing the resilient engagement members of relatively simple and costless resilient pieces 25 formed on the opposite sides of the frame 24 of the filter 21 and of protruding push pieces 26 formed to protrude towards corresponding opposite inner sides of the lid 6.

As described above, since the pleated filter 21 is disposed between the air inlets 4 of the lid 6 and the inlet 22 of the shield member 20 offset from the air inlet 4, with the grooves of the pleats extending from the air inlet 4 to the air inlet 22, the grooves provide air passages between the two air inlets, which eliminates the need of separate air passages. As a consequence, the noise of the centrifugal fan 15 is advantageously prevented from directly escaping outward from the air inlet 4. Furthermore, the air passages can be reduced in thickness to at most the thickness of the filter 21, thereby minimizing the dimensions of the projector.

Further, by offsetting the air inlet 4 of the lid 6 and the inlet 22 of the shield member 20 in the vertical direction to thereby position the air inlet 22 higher than the air inlet 4, the noise of the centrifugal fan 15, if leaking a little from the inlet 4, is directed downward and will have little influence to the users, especially when the projector is installed on a floor.

In a projection type video display apparatus like the liquid crystal projector 1 equipped with an inventive air suction structure as described above, fan noise of the centrifugal fan 15 can be prevented from leaking from the air inlet 4, and the thickness of the projection apparatus can be reduced to that of the filter 21. Thus, the video display apparatus, minimized in size, can provide a quiet video watching environment. This improved structure has an improved filtering performance and is especially advantageous to such video display apparatus equipped with an optical system that must be protected from dust.

There has been known a circumferential vibration-proof fan cover designed to absorb vibrations of the fan. However, the cover, if applied to an axial fan, need be a resilient member having a special configuration, though the axial fan has no air outlet in the circumferential wall thereof. Therefore, conventional vibration-proof cover will increase the cost of the projector. In contrast, the inventive fan mounting structure for a (centrifugal) cooling fan requires only simple resilient members 30 to be attached on the leading end of the supporting projections 27a and 28a. As a consequence, a low cost vibration-absorbing structure for suppressing the vibrations of the centrifugal fan 15 and preventing the noise from being transmitted to the case 2 can be realized by the invention. By securely holding portions of the fan case closer to the fins than the positioning pieces 15c with resilient supportive members 30, vibrations of the centrifugal fan 15 can be effectively suppressed, since larger vibrations tend to appear at these locations.

If a conventional vibration-proof fan cover is used to cover the centrifugal fan 15, the cover must have a more complicated configuration than that for an axial fan, since the centrifugal fan 15 has an air outlet in the circumferential wall thereof. In contrast, the inventive cooling fan system has a simpler configuration than conventional one.

Since the supporting projections 27a and 28a are arranged symmetric with respect the center of the centrifugal fan 15, they can greatly suppress vibrations of the fan 15, thereby holding the fan 15 in a stabilized condition.

It is noted that each of the lower and upper supporting projections 27a and 28a is coaxially aligned to a corresponding projection, so that they can together support the fan 15 from below and above in a stable condition, thereby minimizing vibrations of the fan.

Since the air inlet duct 18 can be utilized as the fan cover section 28 for the centrifugal fan 15, it reduces the cost of the cooling fan mounting structure.

Since the lower case 2b of the case 2 housing the centrifugal fan 15 can be utilized as the centrifugal fan supporting section 27, it reduces the cost of the cooling fan mounting structure.

In a projection type video display apparatus like the liquid crystal projector 1, vibrations of the centrifugal fan 15 can be effectively prevented from being transmitted to the case 2 and from generating a large noise using an inexpensive cooling fan (centrifugal fan) mounting structure as described above. Thus such video display apparatus can provide a quiet video watching environment.

Figure 10:
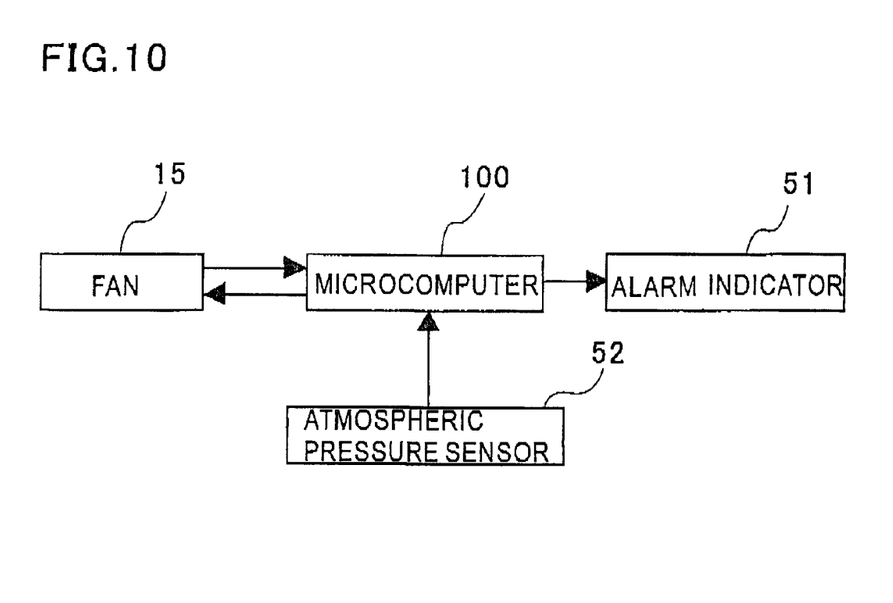
FIG. 10 is a block diagram of a filter clogging detection system in accordance with another embodiment of the invention.

FIG. 10 is a block diagram showing the arrangement of a filter clogging detection system in accordance with another embodiment.

This embodiment has an atmospheric pressure sensor 52 in place of the highland-lowland mode switch 50 in the preceding embodiment.

Upon acquisition of current fan voltage of the fan 15, the microcomputer 100 obtains normal fan rpm value for that current fan voltage in reference to a pre-registered lowland voltage-rpm characteristic stored in a non-volatile memory of the microcomputer 100. When the atmospheric pressure detected by the atmospheric pressure sensor 52 is higher than a predetermined pressure level (which is a boundary between the lowland and highland pressure), the microcomputer 100 enables the alarm indicator 51 to display a filter clogging alarm in the event that the current fan rpm exceeds the normal rpm value plus a predetermined value.

On the other hand, when the atmospheric pressure detected by the atmospheric pressure sensor 52 is lower than the predetermined pressure level, the microcomputer 100 determines the normal rpm value for the current fan voltage in reference to a pre-registered highland voltage-rpm characteristic stored in its built-in non-volatile memory, and enables the alarm indicator 51 to display a filter clogging alarm indicative of clogging of the filter 21 in the event that the current fan rpm is larger than the normal rpm value plus a predetermined value.

Figure 11:
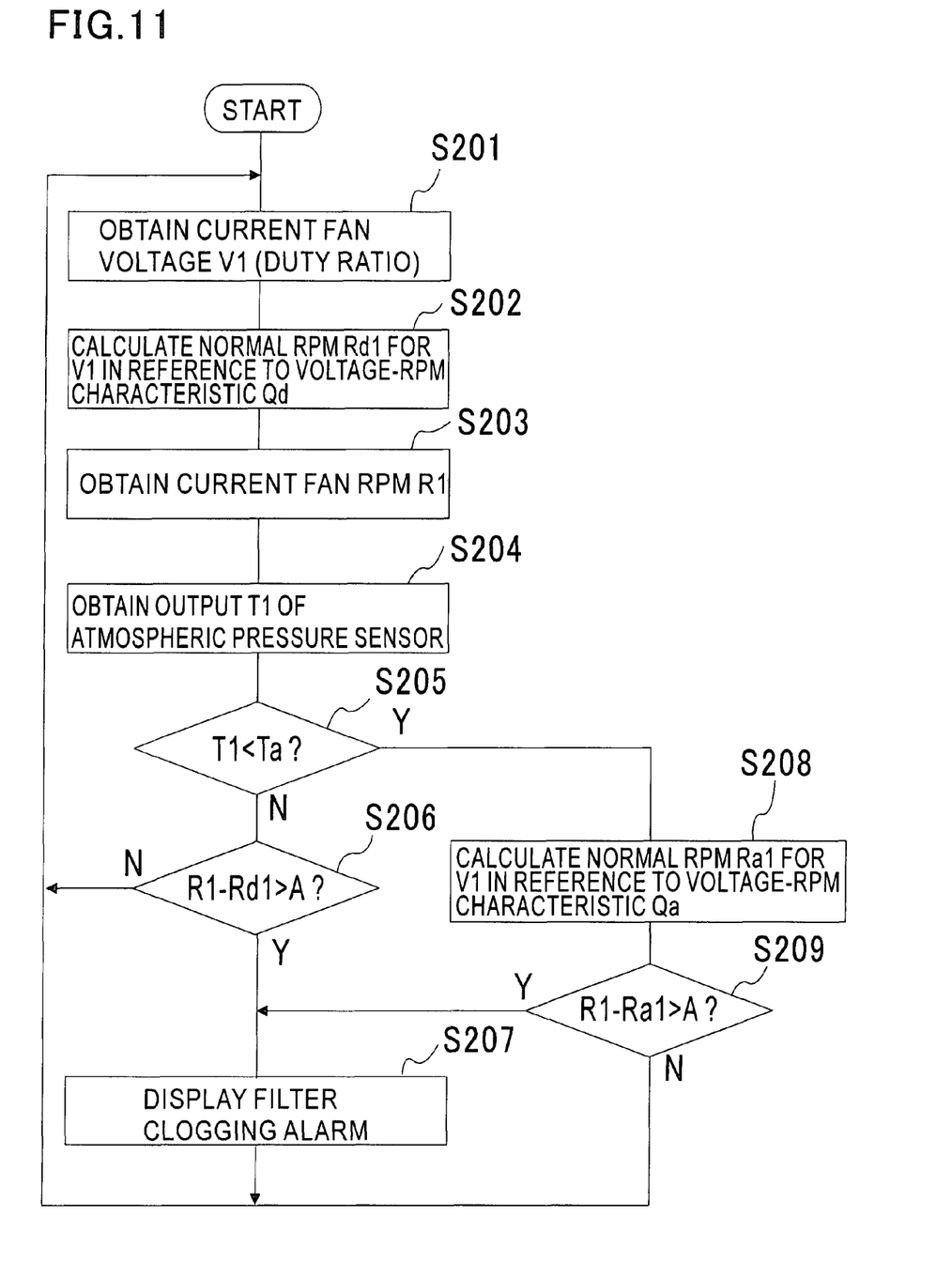
FIG. 11 is a flowchart illustrating major steps of the filter clogging detection process governed by a microcomputer in accordance with another embodiment of the invention.

FIG. 11 is a flowchart showing major steps of the filter clogging detection process governed by the microcomputer 100 in accordance with the embodiment of the invention.

As the control process is started with step "START", the microcomputer 100 first obtains current fan voltage V1 (PWM control duty ratio) of the centrifugal fan 15 in step S201.

Next, the microcomputer 100 obtains the normal rpm value Rd1 for that current fan voltage V1 in reference to the pre-registered lowland voltage-rpm characteristic Qd stored in a non-volatile memory (step S202), along with current fan rpm R1 of the fan 15 (step S203).

The microcomputer 100 then obtains the current atmospheric pressure T1 outputted from the atmospheric pressure sensor 52 (step S204) and checks whether the atmospheric pressure T1 is lower than a predetermined pressure level Ta that defines the boundary between the lowland and highland pressure (step S205).

When the atmospheric pressure T1 is not less than the pressure Ta ("NO" in step S205), a determination is made as to whether the current fan rpm R1 is larger than the normal rpm value Rd1 plus a predetermined value A (i.e. whether or not R1−Rd1>A) (step S206).

While the fan rpm R1 is not larger than the normal rpm value Rd1 plus the predetermined value A, the process returns to step S201 to repeat the above described steps. As the fan rpm R1 becomes larger than the normal rpm Rd1 plus the value A ("YES" in step S206), implying that the filter 21 is clogged, the microcomputer 100 enables the alarm indicator 51 to flicker its LED to display a filter clogging alarm (step S207). Recognizing the clogging alarm of the filter 21, the operator of the projector can cope with filter clogging problem by opening the lid 6 and doing appropriate maintenance work.

On the other hand, when the liquid crystal projector equipped with a clean filter 21 is set up at a highland site, where the pressure T1 detected by the atmospheric pressure sensor 52 is less than the boundary atmospheric pressure Ta, the process branches out from step S205 to step S208.

In step S208, the normal rpm value Ra1 for the current fan voltage V1 is determined in reference to the pre-registered highland voltage-rpm characteristic Qa stored in the non-volatile memory of the microcomputer 100.

Then a determination is made as to whether the fan rpm R1 is larger than the normal rpm value Ra1 plus a predetermined value A (R1−Ra1>A) (step S209).

While fan rpm R1 is not larger than the normal rpm value Ra1 plus the value A, the process will loop back to step S201 and goes through the steps described above. As the fan rpm R1 becomes larger than the normal rpm value Ra1 plus the value A ("YES" in step S209), implying that the filter 21 is clogged, the microcomputer 100 causes the LED, for example, of the alarm indicator 51 to flicker (step S207). Recognizing clogging of the filter 21 from the alarm, the operator of the projector can resolve the filter clogging problem by opening the lid 6 and doing appropriate maintenance work.

It should be understood that, although only one highland voltage-rpm characteristic Qa is pre-registered in the example shown herein, it is possible to prepare a multiplicity of such characteristics data each defined for a specific range of pressure, in association with a range of altitude of, for example, 1000-2000 meters, 2000-3000 meters, etc.

In this way, with the filter clogging detection system in accordance with the embodiment of the invention, the normal rpm value Ra1 for the highland mode is obtained for current fan voltage V1 based on the highland voltage-rpm characteristic Qa when the atmospheric pressure T1 detected by the atmospheric pressure sensor 52 is lower than the predetermined atmospheric pressure Ta, and a filter clogging alarm is issued in the event that current fan rpm R1 exceeds the normal rpm value plus a predetermined value A. This permits accurate filter clogging detection in highlands.

By preparing pre-registered lowland and highland voltage-rpm characteristics Qd and Qa, respectively, accurate filter clogging detection can be achieved even in highlands without resorting to a complex control system.

More accurate filter clogging detection can be achieved by preparing a multiplicity of pre-registered highland voltage-rpm characteristic data each defined for a predetermined range of pressure and by selectively use them as the highland voltage-rpm characteristic Qa in accord with the atmospheric pressure as detected by the atmospheric pressure sensor 52.

In the above, an embodiment has been described in which filter clogging detection system is controlled on the basis of fan voltage detected and by making reference to a voltage-rpm characteristic. However, filter clogging detection can be achieved in similar fashion on the basis of current fan rpm and by making reference to an rpm-voltage characteristic. In this case, the rolls of the "voltage" and "rpm" are reversed in the respective embodiments. Note that, given a fan voltage, fan rpm increases with filter clogging and with decreasing atmospheric pressure, but, given a fan rpm, fan voltage decreases with filter clogging and with decreasing atmospheric pressure. Therefore, the filter clogging alarm may be enabled when the fan voltage has decreased below the normal voltage minus a predetermined value.

The invention has been described above with reference to projection type video display apparatuses that use optical modulators in the form of liquid crystal panels. However, the invention can be equally applied to other types of projection type video display apparatuses that utilize different image generation means. For example, the invention can be applied to a projector employing DLP (Digital Light Processing, which is a registered trademark of Texas Instruments (TI), Inc.). The invention can be also applied to other types of projectors including front projectors and rear projectors.

It would be readily apparent to a person skilled in the art that by providing an electronic apparatus in general with the filter detection system, air suction structure, and cooling-fan mounting structure of the invention, the apparatus can be reduced in thickness as thin as the filter itself, and will gain capabilities to:

accurately detect and prevent clogging of a filter used in highlands;

suppress fan noise that tends to escape from an air inlet;

have an improved filter performance; and effectively suppress propagation of cooling fan vibrations to the case of the apparatus in a cost-effective manner.

The invention claimed is:

1. A projection type video display apparatus for projecting imaging light that is obtained by modulating light emitted from a light source by video signals, the projector equipped with a filter clogging detection system for detecting clogging of a filter for a cooling fan sucking air through the filter to cool heat generating components of the projector, the filter clogging detection system comprising:

switching means for switching the operational mode of the cooling fan between a lowland mode and a highland mode; and a controller to obtain a current fan voltage to determine a normal rpm value corresponding to the current fan voltage in reference to a lowland voltage-rpm characteristic when the switching means is in the lowland mode, obtain a current fan rpm, and enable an alarming means to issue a filter clogging alarm in the event that the current fan rpm is larger than the normal rpm value plus a predetermined value, and obtain a current fan voltage to determine a normal rpm value corresponding to the current fan voltage in reference to a highland voltage-rpm characteristic when the switching means is in the highland mode, obtain a current fan rpm, and enable the alarming means to issue a filter clogging alarm in the event that the current fan rpm is larger than the normal rpm value plus a predetermined value.

2. The projection type video display apparatus according to claim 1, wherein the controller uses:

a pre-registered voltage-rpm characteristic as the lowland voltage-rpm characteristic, and a voltage-rpm characteristic that is obtained at the time when the switching means is switched over to the highland mode as the highland voltage-rpm characteristic.

3. A projection type video display apparatus for projecting imaging light that is obtained by modulating light emitted from a light source by video signals, the projector equipped with a filter clogging detection system for detecting clogging of a filter for a cooling fan sucking air through the filter to cool heat generating components of the projector, the filter clogging detection system comprising:

pressure detection means for detecting the atmospheric pressure at the installation location of the cooling fan; and a controller to obtain a current fan voltage, obtain a normal rpm value corresponding to the current fan voltage in reference to a lowland voltage-rpm characteristic, obtain a current fan rpm, enable alarming means to issue a filter clogging alarm in the event that the atmospheric pressure detected by the pressure detection means is higher than a predetermined pressure level and that the current fan rpm is larger than the normal rpm value plus a predetermined value, and obtain a normal rpm value corresponding to the current fan voltage in reference to a highland voltage-rpm characteristic when the atmospheric pressure detected is lower than the predetermined pressure level, and enable an alarming means to issue a filter clogging alarm in the event that the current fan rpm is larger than the normal fan rpm value plus a predetermined value.

4. The projection type video display apparatus according to claim 3, wherein the controller uses pre-registered voltage-rpm characteristics as the lowland and highland voltage-rpm characteristics.

5. The projection type video display apparatus according to claim 4, wherein the controller selects, in accord with the atmospheric pressure detected by the atmospheric pressure detection means, an appropriate one of a multiplicity of pre-registered voltage-rpm characteristics individually defined for different ranges of pressure, and uses the selected one as the highland voltage-rpm characteristic.

6. A projection type video display apparatus for projecting imaging light that is obtained by modulating light emitted from a light source by video signals, the projector equipped with a filter clogging detection system for detecting clogging of a filter for a cooling fan sucking air through the filter to cool heat generating components of the projector, the filter clogging detection system comprising:

switching means for switching the operational mode of the cooling fan between a lowland mode and a highland mode; and a controller to obtain a current fan rpm to determine a normal voltage corresponding to the current fan rpm in reference to a lowland rpm-voltage characteristic when the switching means is in the lowland mode, obtain current fan voltage, and enable an alarming means to issue a filter clogging alarm in the event that the current fan voltage is less than the normal voltage minus a predetermined value, and obtain a current fan rpm to determine the normal voltage corresponding to the current fan rpm in reference to a highland rpm-voltage characteristic when the switching means is in the highland mode, obtain current fan voltage, and enable the alarming means to issue a filter clogging alarm in the event that the current fan voltage is less than the normal voltage minus a predetermined value.

7. The projection type video display apparatus according to claim 6, wherein the controller uses:

a pre-registered rpm-voltage characteristic as the lowland rpm-voltage characteristic, and an rpm-voltage characteristic that is obtained at the time when the switching means is switched over to the highland mode as the highland rpm-voltage characteristic.

8. A projection type video display apparatus for projecting imaging light that is obtained by modulating light emitted from a light source by video signals, the projector equipped with a filter clogging detection system for detecting clogging of a filter for a cooling fan sucking air through the filter to cool heat generating components of the projector, the filter clogging detection system characterized by comprising:

pressure detection means for detecting the atmospheric pressure at the installation location of the cooling fan; and a controller to obtain a current fan rpm, obtain a normal voltage corresponding to the current fan rpm in reference to a lowland rpm-voltage characteristic, obtain a current fan voltage, enable an alarming means to issue a filter clogging alarm in the event that the atmospheric pressure detected by the pressure detection means is higher than a predetermined pressure level and that the current fan voltage is less than the normal voltage minus a predetermined value, and obtain a normal voltage corresponding to the current fan voltage in reference to a highland rpm-voltage characteristic when the atmospheric pressure detected is less than the predetermined pressure level, and enable the alarming means to issue a filter clogging alarm in the event that the current fan voltage is less than the normal voltage minus a predetermined value.

9. The projection type video display apparatus according to claim 8, wherein the controller uses pre-registered rpm-voltage characteristics as the lowland and highland rpm-voltage characteristics.

10. The projection type video display apparatus according to claim 9, wherein the controller selects, in accord with the atmospheric pressure detected by the atmospheric pressure detection means, an appropriate one of a multiplicity of pre-registered rpm-voltage characteristics which are individually defined for different ranges of atmospheric pressure, and uses the selected one as the highland rpm-voltage characteristic.

* * * * *